(12) United States Patent
Takahashi et al.

(10) Patent No.: US 11,460,445 B2
(45) Date of Patent: Oct. 4, 2022

(54) METHOD OF PRODUCING ULTRASONIC INSPECTION SYSTEM

(71) Applicant: SUBARU CORPORATION, Tokyo (JP)

(72) Inventors: Kohei Takahashi, Tokyo (JP); Kousaburou Akiba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 288 days.

(21) Appl. No.: 16/751,220

(22) Filed: Jan. 24, 2020

(65) Prior Publication Data

US 2020/0158691 A1 May 21, 2020

Related U.S. Application Data

(63) Continuation of application No. PCT/JP2018/014307, filed on Apr. 3, 2018.

(30) Foreign Application Priority Data

Jul. 27, 2017 (JP) .............................. JP2017-145896

(51) Int. Cl.
*B64F 5/10* (2017.01)
*B64F 5/00* (2017.01)
(Continued)

(52) U.S. Cl.
CPC ............. *G01N 29/041* (2013.01); *B64F 5/00* (2013.01); *B64F 5/10* (2017.01); *G01N 29/4436* (2013.01); *G01N 2291/106* (2013.01)

(58) Field of Classification Search
CPC ............. G01N 29/041; G01N 29/4436; G01N 29/223; G01N 29/348; G01N 29/04;
(Continued)

(56) References Cited

U.S. PATENT DOCUMENTS

| 5,031,458 A | 7/1991 | Young et al. |
| 2007/0000328 A1 | 1/2007 | Buttram |

(Continued)

FOREIGN PATENT DOCUMENTS

| JP | H04-191653 | 7/1992 |
| JP | 2002-148242 A | 5/2002 |

(Continued)

OTHER PUBLICATIONS

JP-2016107624-A English translation (Year: 2016).*

(Continued)

*Primary Examiner* — Jason L Vaughan
*Assistant Examiner* — Amanda Kreiling
(74) *Attorney, Agent, or Firm* — Smith, Gambrell & Russell, LLP

(57) ABSTRACT

According to one implementation, a method of producing an ultrasonic inspection system includes creating design information on the ultrasonic inspection system and assembling the ultrasonic inspection system based on the design information. The design information includes numbers, positions and directions of at least one ultrasonic sensor and at least one ultrasonic transducer. The design information is created by an optimization calculation of which at least one parameter includes at least one of the numbers, positions and directions of the at least one ultrasonic sensor and the at least one ultrasonic transducer. The optimization calculation includes a simulation of an ultrasonic inspection for detecting a defect by the ultrasonic inspection system having the at least one ultrasonic sensor and the at least one ultrasonic transducer. The simulation is performed using a model simulating an object of the ultrasonic inspection.

10 Claims, 7 Drawing Sheets

(51) Int. Cl.
*G01N 29/04* (2006.01)
*G01N 29/44* (2006.01)

(58) Field of Classification Search
CPC .. G01N 29/043; G01N 29/4472; G01N 29/46; Y10T 29/49774
See application file for complete search history.

(56) References Cited

U.S. PATENT DOCUMENTS

| 2011/0231112 | A1 | 9/2011 | Soejima et al. |
| 2014/0172399 | A1 | 6/2014 | Ume et al. |
| 2014/0216158 | A1* | 8/2014 | Sanabria Martin .... G01N 29/06 73/588 |
| 2015/0024160 | A1 | 1/2015 | Georgeson et al. |

FOREIGN PATENT DOCUMENTS

| JP | 2002-296249 A | 10/2002 | |
| JP | 2005-315636 A | 11/2005 | |
| JP | 2009-097942 A | 5/2009 | |
| JP | 2011-191230 | 9/2011 | |
| JP | 2012-112658 | 6/2012 | |
| JP | 2013-088421 | 5/2013 | |
| JP | 2014-194379 | 10/2014 | |
| JP | 2016-038361 | 3/2016 | |
| JP | 2016-107624 | 6/2016 | |
| JP | 2016-517050 | 6/2016 | |
| JP | 2016107624 A * | 6/2016 | ............ B29C 65/48 |
| WO | 2014/116406 A2 | 7/2014 | |
| WO | 2019/021538 A1 | 1/2019 | |

OTHER PUBLICATIONS

Final Japanese Office Action dated Feb. 25, 2021 in Patent Application No. 2019-532369 (5 pages in Japanese with English translation).
International Search Report for PCT/JP2018/014307 dated Jul. 3, 2018 (6 pages with English Translation).
Written Opinion for PCT/JP2018/014307 dated Jul. 3, 2018 (6 pages).
Japanese Office Action dated Aug. 27, 2020 for Patent Application No. 2019-532369 (5 pages in Japanese with Machine Translation).
Extended European search report dated Mar. 31, 2021 in EP Patent Application No. 18 83 9450.6 (11 pages).
Stefano, M., et al. Predictions of defect detection performance of air-coupled ultrasonic rail inspection system. Structural Health Monitoring. 2017. vol. 17, No. 3, pp. 684-705.
Notification of Transmittal of Translation of the International Preliminary Report on Patentability in PCT/US2018/014307, dated Feb. 6, 2020 (9 pages with English Translation).

* cited by examiner

METHOD OF PRODUCING ULTRASONIC INSPECTION SYSTEM

CROSS REFERENCES TO RELATED APPLICATIONS

This is a continuation of Application PCT/JP2018/14307, filed on Apr. 3, 2018.

This application is based upon and claims the benefit of priority from Japanese Patent Application No. 2017-145896 filed on Jul. 27, 2017; the entire contents of which are incorporated herein by reference.

FIELD

Implementations described herein relate generally to a method of producing an ultrasonic inspection system, a design system of an ultrasonic inspection system, a design program of an ultrasonic inspection system, a method of producing an aircraft structural object, an ultrasonic inspection system and an aircraft structural object.

BACKGROUND

Conventionally, an ultrasonic inspection method is known as a nondestructive inspection method of a defect in an object (for example, refer to Japanese Patent Application Publication JP 2011-191230 A, Japanese Patent Application Publication JP 2013-088421 A and Japanese Patent Application Publication JP 2014-194379 A).

In order to perform an ultrasonic inspection accurately, it is important to dispose an ultrasonic transducer, oscillating an ultrasonic wave, and a sensor, detecting the ultrasonic wave, at appropriate positions respectively according to an inspection area. Specifically, it is necessary to dispose an ultrasonic transducer and an ultrasonic sensor at positions where an ultrasonic wave can be transmitted within an inspection area while the ultrasonic wave which passed through the inspection area can be detected.

Therefore, when an inspection area is wide, like in a case of an aircraft structural object, for example, it is necessary to dispose many ultrasonic transducers and ultrasonic sensors so that the inspection area can be covered. Meanwhile, when the number of ultrasonic transducers and ultrasonic sensors increase, the number of parts increases. Therefore, it is desirable that the number of ultrasonic transducers and ultrasonic sensors is low. In particular, in a case that an object to be inspected is an aircraft, increase in the number of ultrasonic transducers and ultrasonic sensors leads to increase in weight of the aircraft.

Accordingly, the appropriate numbers and positions of ultrasonic transducers and ultrasonic sensors have conventionally been determined by repeating trial and error using a large number of test pieces which simulates an aircraft structural object. This is a factor of a great deal of labor in an aircraft design.

On the contrary, when positions of ultrasonic transducers and ultrasonic sensors are not appropriate, an inspection area is not covered and there is a possibility that it may become impossible to detect a defect which should be detected. Specifically, an inappropriate arrangement of ultrasonic transducers and ultrasonic sensors leads to degradation in detection accuracy of a defect. Therefore, it is important to dispose ultrasonic transducers and ultrasonic sensors at appropriate positions so that an inspection area may certainly be covered.

Accordingly, an object of the present invention is to allow an ultrasonic inspection with higher precision using fewer parts.

SUMMARY OF THE INVENTION

In general, according to one implementation, a method of producing an ultrasonic inspection system includes: creating design information on the ultrasonic inspection system; and assembling the ultrasonic inspection system based on the design information. The design information includes the number of at least one ultrasonic sensor, a position of the at least one ultrasonic sensor, a direction of the at least one ultrasonic sensor, the number of at least one ultrasonic transducer, a position of the at least one ultrasonic transducer, a direction of the at least one ultrasonic transducer and a frequency of an ultrasonic wave oscillated from the at least one ultrasonic transducer. The design information is created by an optimization calculation of which at least one parameter includes at least one of the number of the at least one ultrasonic sensor, the position of the at least one ultrasonic sensor, the direction of the at least one ultrasonic sensor, the number of the at least one ultrasonic transducer, the position of the at least one ultrasonic transducer, the direction of the at least one ultrasonic transducer and the frequency of the ultrasonic wave. The optimization calculation includes a simulation of an ultrasonic inspection for detecting a defect by the ultrasonic inspection system having the at least one ultrasonic sensor and the at least one ultrasonic transducer. The simulation is performed using a model simulating an object of the ultrasonic inspection.

Further, according to one implementation, a design system of an ultrasonic inspection system includes: a modeling part and a design information creation part. The modeling part is adapted to produce a model simulating an object of an ultrasonic inspection for detecting a defect by an ultrasonic inspection system including at least one ultrasonic sensor and at least one ultrasonic transducer. The design information creation part is adapted to create design information on the ultrasonic inspection system. The design information includes the number of the at least one ultrasonic sensor, a position of the at least one ultrasonic sensor, a direction of the at least one ultrasonic sensor, the number of the at least one ultrasonic transducer, a position of the at least one ultrasonic transducer, a direction of the at least one ultrasonic transducer and a frequency of an ultrasonic wave oscillated from the at least one ultrasonic transducer. The design information is created by an optimization calculation of which at least one parameter includes at least one of the number of the at least one ultrasonic sensor, the position of the at least one ultrasonic sensor, the direction of the at least one ultrasonic sensor, the number of the at least one ultrasonic transducer, the position of the at least one ultrasonic transducer, the direction of the at least one ultrasonic transducer and the frequency of the ultrasonic wave. The optimization calculation includes a simulation of the ultrasonic inspection. The simulation is performed using the model.

Further, according to one implementation, a design program of an ultrasonic inspection system has a computer to execute: producing a model simulating an object of an ultrasonic inspection for detecting a defect by an ultrasonic inspection system including at least one ultrasonic sensor and at least one ultrasonic transducer; and creating design information on the ultrasonic inspection system. The design information includes the number of the at least one ultrasonic sensor, a position of the at least one ultrasonic sensor, a direction of the at least one ultrasonic sensor, the number of the at least one ultrasonic transducer, a position of the at least one ultrasonic transducer, a direction of the at least one ultrasonic transducer and a frequency of an ultrasonic wave oscillated from the at least one ultrasonic transducer. The design information is created by an optimization calculation of which at least one parameter includes at least one of the number of the at least one ultrasonic sensor, the position of the at least one ultrasonic sensor, the direction of the at least one ultrasonic sensor, the number of the at least one ultrasonic transducer, the position of the at least one ultrasonic transducer, the direction of the at least one ultrasonic transducer and the frequency of the ultrasonic wave. The optimization calculation includes a simulation of the ultrasonic inspection. The simulation is performed using the model.

Further, according to one implementation, a method of producing an aircraft structural object includes attaching the ultrasonic inspection system to the aircraft structural object. The ultrasonic inspection system is assembled by the above-mentioned method.

Further, according to one implementation, an ultrasonic inspection system includes an ultrasonic transducer, an ultrasonic sensor and a signal processing system. The ultrasonic transducer oscillates an ultrasonic wave to an object area of an ultrasonic inspection. The ultrasonic sensor outputs an ultrasonic detection signal by detecting at least one of a transmitted wave, which was transmitted in the object area, of the ultrasonic wave and a reflected wave, which was reflected in the object area, of the ultrasonic wave. The signal processing system is adapted to detect a waveform change, from a reference waveform, of the ultrasonic detection signal and detect whether a defect was generated in the object area, based on the detected waveform change. At least one of the ultrasonic transducer and the ultrasonic sensor is disposed in a section out of sections virtually made on a surface of an object of the ultrasonic inspection. A probability that a waveform change detectable by the signal processing system arises in the ultrasonic detection signal becomes a maximum when the at least one of the ultrasonic transducer and the ultrasonic sensor is disposed in the section. The waveform change arises due to the defect generated at an uncertain position in the object area.

Further, according to one implementation, an ultrasonic inspection system includes at least one ultrasonic transducer, at least one ultrasonic sensor and a signal processing system. The at least one ultrasonic transducer oscillates an ultrasonic wave to an object area of an ultrasonic inspection. The object area has a web and a flange. The at least one ultrasonic sensor outputs an ultrasonic detection signal by detecting at least one of a transmitted wave, which was transmitted in the object area, of the ultrasonic wave and a reflected wave, which was reflected in the object area, of the ultrasonic wave. The signal processing system is adapted to detect a waveform change, from a reference waveform, of the ultrasonic detection signal and detect whether a defect was generated in the object area, based on the detected waveform change. Positions and numbers of the at least one ultrasonic transducer and the at least one ultrasonic sensor are positions and numbers where the signal processing system can detect the waveform change, due to the defect, in the ultrasonic detection signal even when the defect was generated at any position in the object area.

Further, according to one implementation, an aircraft structural object includes the above-mentioned ultrasonic inspection system.

BRIEF DESCRIPTION OF THE DRAWINGS

In the accompanying drawings.

DETAILED DESCRIPTION

Figure 1:
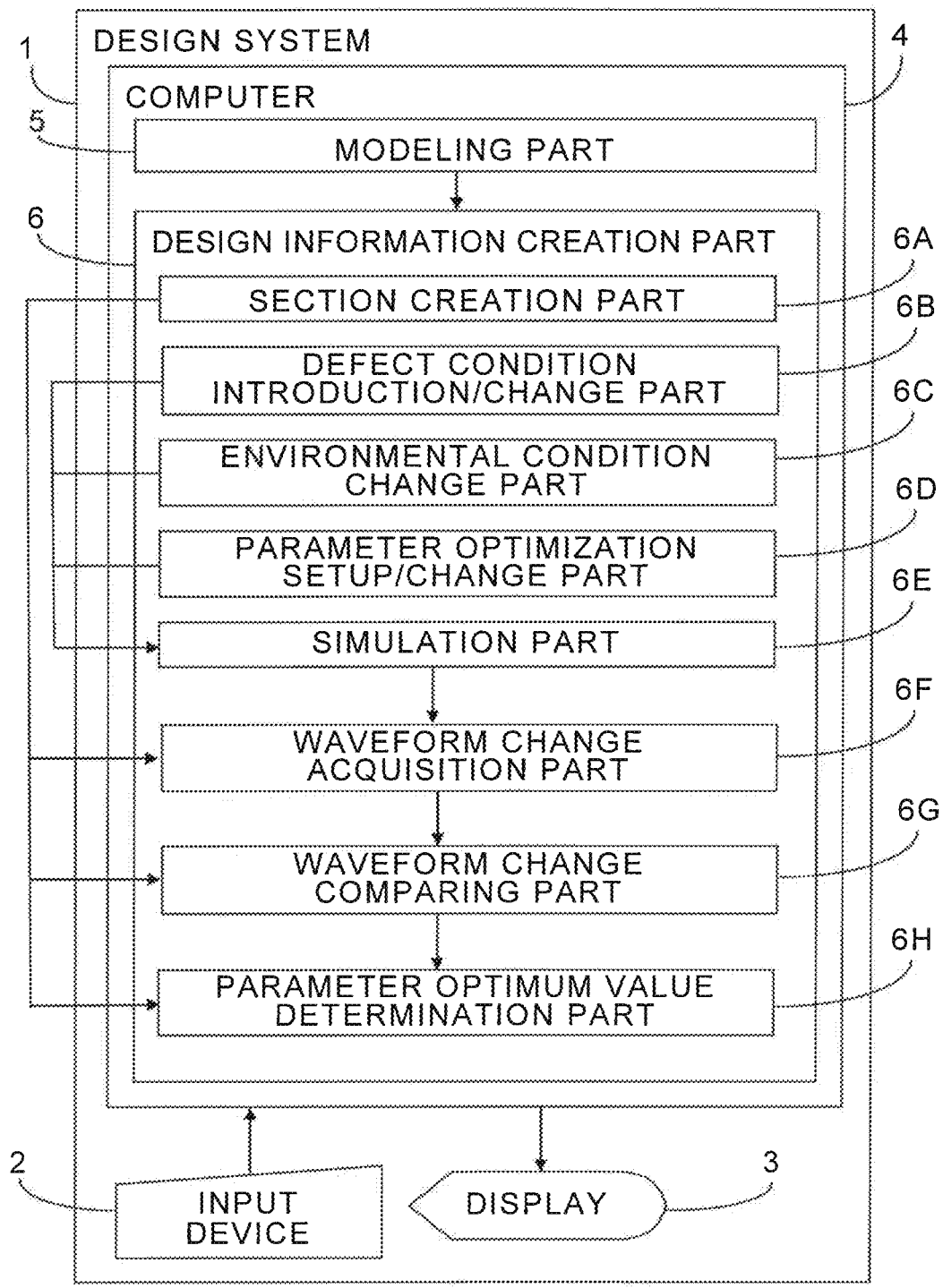
FIG. 1 is a functional block diagram of a design system of an ultrasonic inspection system according to an implementation of the present invention.

A method of producing an ultrasonic inspection system, a design system of an ultrasonic inspection system, a design program of an ultrasonic inspection system, a method of producing an aircraft structural object, an ultrasonic inspection system and an aircraft structural object according to implementations of the present invention will be described with reference to the accompanying drawings.
(Configuration and Function of Design System of Ultrasonic Inspection System)
FIG. 1 is a functional block diagram of a design system of an ultrasonic inspection system according to an implementation of the present invention.

A design system 1 of an ultrasonic inspection system performs an optimum design of the ultrasonic inspection system including at least one ultrasonic sensor and at least one ultrasonic transducer. Specifically, the design system 1 of an ultrasonic inspection system has a function to produce design information on the ultrasonic inspection system, including the number of ultrasonic sensors, positions of the ultrasonic sensors, directions of the ultrasonic sensors, the number of ultrasonic transducers, positions of the ultrasonic transducers, directions of the ultrasonic transducers and frequencies of ultrasonic waves oscillated from the ultrasonic transducers, by an optimization calculation whose parameters include at least one of the number of the ultrasonic sensors, the positions of the ultrasonic sensors, the directions of the ultrasonic sensors, the number of the ultrasonic transducers, the positions of the ultrasonic transducers, the directions of the ultrasonic transducers and the frequencies of the ultrasonic waves oscillated from the ultrasonic transducers.

The design system 1 of an ultrasonic inspection system can be composed of an input device 2, a display 3 and a computer 4 to which the input device 2 and the display 3 are coupled. The computer 4 reads a design program of an ultrasonic inspection system. That is, the design system 1 of an ultrasonic inspection system can be configured by information processing circuitry.

The design system 1 of an ultrasonic inspection system may be composed of the computer 4 which functions as a modeling part 5 and a design information creation part 6 by reading the design program of an ultrasonic inspection system into the computer 4.

The modeling part 5 has a function to produce a model which simulates an object of an ultrasonic inspection for detecting the existence of a defect by an ultrasonic inspection system. Meanwhile, the design information creation part 6 has a function to create design information on an ultrasonic inspection system, including the number of ultrasonic sensors, positions of the ultrasonic sensors, directions of the ultrasonic sensors, the number of ultrasonic transducers, positions of the ultrasonic transducers, directions of the ultrasonic transducers and frequencies of ultrasonic waves oscillated from the ultrasonic transducers, by optimization calculation including simulation of an ultrasonic inspection using a model produced by the modeling part 5.

Therefore, the design program of an ultrasonic inspection system makes the computer 4 execute at least a step of producing a model which simulates an object of an ultrasonic inspection and a step of creating design information on the ultrasonic inspection system by optimization calculation including simulation of the ultrasonic inspection. The design program of an ultrasonic inspection system installed in information processing circuitry can also be distributed as a program product by recording on an information recording medium.

Figure 2:
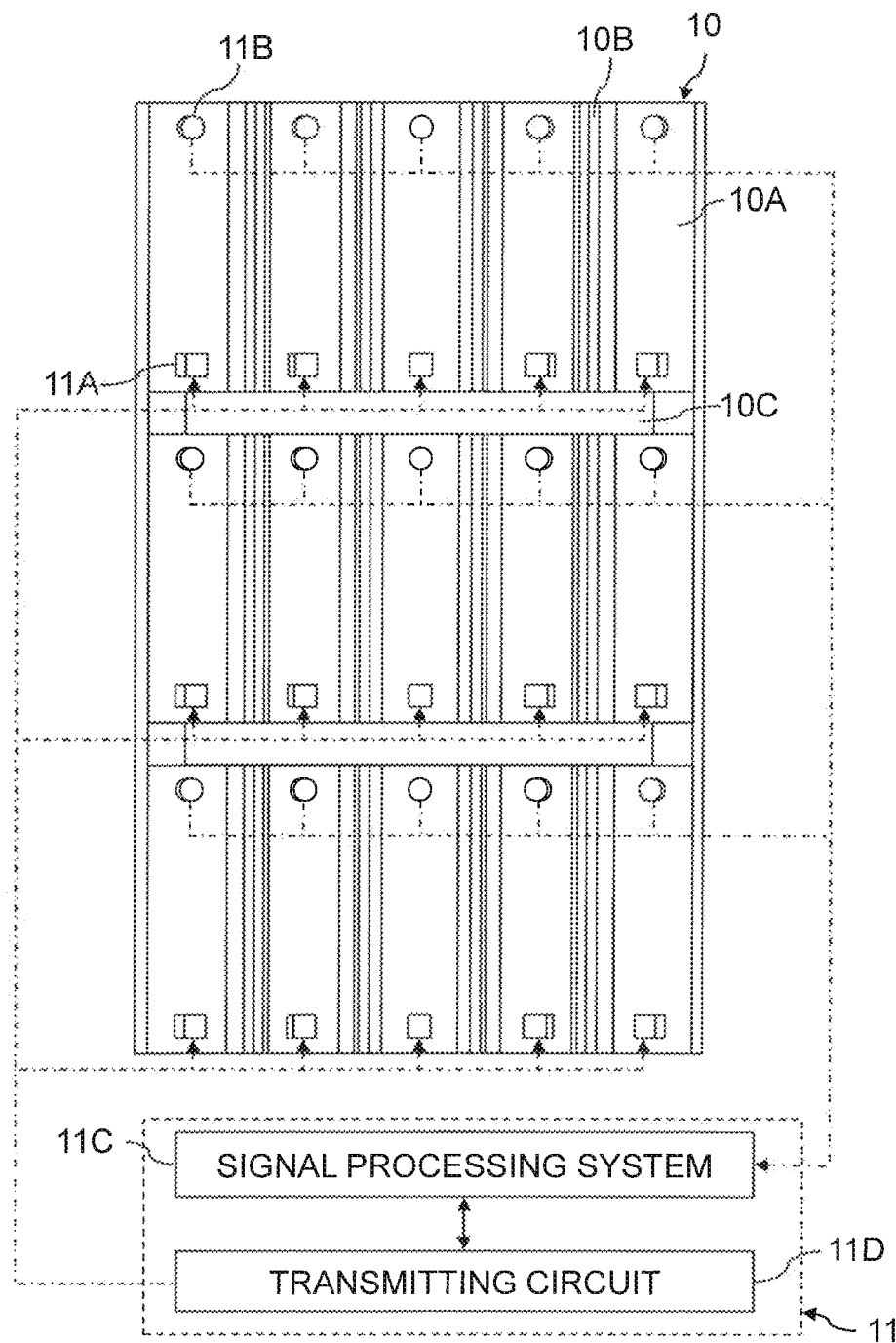
FIG. 2 is a front view showing an example of an ultrasonic inspection system to be designed by the design system shown in FIG. 1 and an aircraft structural object to be an object of an ultrasonic inspection.
Figure 3:
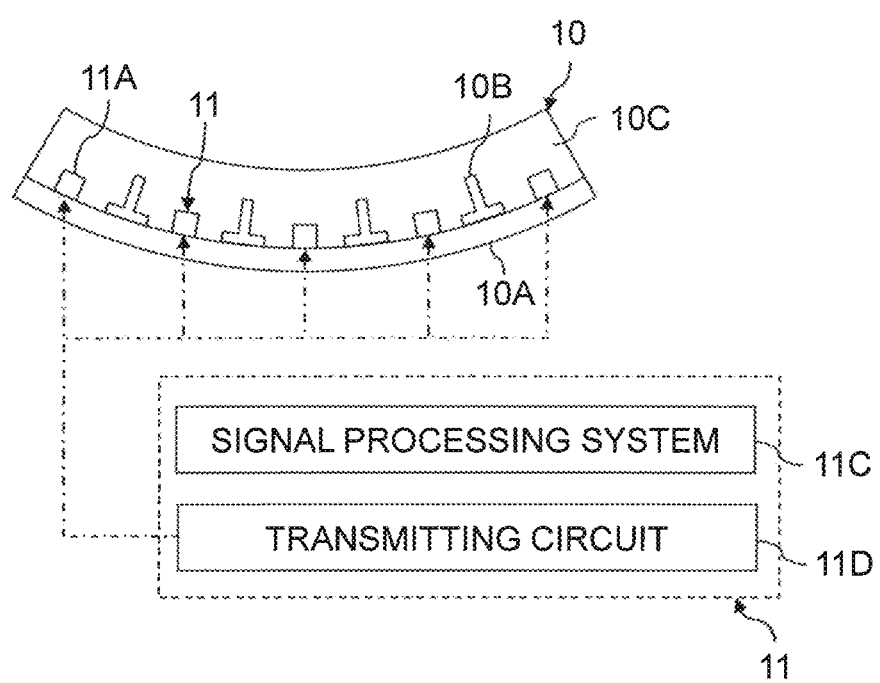
FIG. 3 is a bottom view of the ultrasonic inspection system and the aircraft structural object shown in FIG. 2.

FIG. 2 is a front view showing an example of an ultrasonic inspection system to be designed by the design system 1 shown in FIG. 1 and an aircraft structural object to be an object of an ultrasonic inspection, and FIG. 3 is a bottom view of the ultrasonic inspection system and the aircraft structural object shown in FIG. 2.

As exemplified in FIG. 2 and FIG. 3, an aircraft structural object 10 can mount an ultrasonic inspection system 11. Then, the aircraft structural object 10 can be an object of an ultrasonic inspection by the ultrasonic inspection system 11. Specifically, a defect which may arise in the aircraft structural object 10 can be detected by an ultrasonic inspection with the ultrasonic inspection system 11.

Examples of a defect to be detected include not only damage, a dent, a break of fibers composing a composite material, and a delamination between fiber reinforced resin layers composing a composite material, caused by a collision of a bird or a stone, or the like, but a burnt deposit of a composite material due to a lightning strike, and a dropout or a looseness of a fastener.

In an example shown in FIG. 2 and FIG. 3, an aircraft structural object 10 has a structure composed of a curved panel 10A, stringers 10B and frames 10C. The stringers 10B and the frames 10C have been attached on the panel 10A in directions where longitudinal directions are nearly orthogonal to each other. More specifically, the stringers 10B and the frames 10C have been attached to the curved panel 10A so that the length directions of the stringers 10B become nearly parallel to each other, the length directions of the frames 10C become nearly parallel to each other, and the length direction of each stringer 10B becomes nearly perpendicular to the length direction of each frame 10C.

As a result, many areas each surrounded by the two adjacent stringers 10B and the two adjacent frames 10C are formed on the panel 10A. The aircraft structural object 10 which has such a structure is mainly adopted as a structural object composing a part of fuselage.

Accordingly, an aircraft structural object which has a desired structure including not only a structure in which reinforcement materials has been attached to a plate-like member, such as the panel 10A to which the stringers 10B and the frames 10C have been attached, that is, a structure which has webs and flanges, but a honeycomb sandwich structure and a single panel can be an object of an ultrasonic inspection. Examples of a reinforcement member attached on a panel composing an aircraft structural object include a spar and a rib besides a stringer. Moreover, not only an aircraft structural object, but also an automobile part, or the like, may be an object of an ultrasonic inspection.

An ultrasonic inspection system 11 for performing an ultrasonic inspection can be composed of at least one ultrasonic transducer 11A, at least one ultrasonic sensor 11B, a signal processing system 11C and a transmitting circuit 11D. The ultrasonic transducer 11A is an ultrasonic actuator or the like which oscillates an ultrasonic wave towards an object area of the ultrasonic inspection. The ultrasonic sensor 11B detects at least one of a transmitted ultrasonic wave, which was transmitted in an object area, or a reflected ultrasonic wave, which was reflected by an object area, and outputs an ultrasonic detection signal. The signal processing system 11C detects whether a defect occurs in an object area. The transmitting circuit 11D generates a transmission signal and applies the generated transmission signal to each ultrasonic transducer 11A.

Examples of the ultrasonic sensor 11B include an optical fiber sensor, such as an FBG (fiber Bragg grating) sensor and a PS-FBG (phase-shifted FBG) sensor, besides an ultrasonic transducer. Note that, the PS-FBG is an FBG in which a local phase shift is introduced into a periodic change of the refractive index.

The signal processing system 11C has a function to receive an ultrasonic detection signal output from the ultrasonic sensor 11B, a function to detect a waveform change of the received ultrasonic detection signal from a reference waveform and a function to detect whether a defect occurred in an object area of ultrasonic inspection, based on the detected waveform change. The reference waveform compared with a waveform of ultrasonic detection signal detected by the ultrasonic sensor 11B is a waveform of ultrasonic detection signal obtained from an object area where it has been previously confirmed that there is no defect. Therefore, a waveform change, resulting from a defect, of an ultrasonic detection signal detected by the ultrasonic sensor 11B can be detected by comparing the ultrasonic detection signal with the reference waveform.

The signal processing system 11C can be composed of circuitry, including an A/D (analog-to-digital) converter and a computer. When the ultrasonic sensor 11B is an optical fiber sensor, a photoelectric converter for converting an ultrasonic detection signal output from the ultrasonic sensor 11B, from an optical signal into an electric signal, is included in the signal processing system 11C. The signal processing system 11C may also have optical systems, such as a wavelength filter for signal processing of an ultrasonic detection signal output as an optical signal from ultrasonic sensor 11B, and an optical circulator for branching an output path of an optical signal from an optical path for propagating a laser light from a light source to the optical fiber sensor, as necessary.

Therefore, the signal processing system 11C is composed of at least circuitry, and when the ultrasonic sensor 11B is an optical fiber sensor, necessary optical elements can be used as elements.

As shown in FIG. 2 and FIG. 3, when an object of an ultrasonic inspection is the aircraft structural object 10 composed of the stringers 10B and the frames 10C attached to the panel 10A, the ultrasonic transducer 11A and the ultrasonic sensor 11B of the ultrasonic inspection system 11 can be disposed in each of areas surrounded by the stringers 10B and the frames 10C. An object area of an ultrasonic inspection can include on not only a surface and inside of the panel 10A but also desired areas, such as between the stringer 10B and the panel 10A, and between the frame 10C and the panel 10A, which are possible to propagate an ultrasonic wave.

While each ultrasonic sensor 11B has been disposed so that an ultrasonic wave, which was transmitted in an object area of an ultrasonic inspection, can be detected in an example shown in FIG. 2 and FIG. 3, at least one ultrasonic sensor 11B may also be disposed so that a wave reflected by a defect which occurred in the object area can be detected. Each ultrasonic sensor 11B detects not only an ultrasonic wave advancing straight toward the ultrasonic sensor 11B from the ultrasonic transducer 11A, but ultrasonic waves reflected by flanges, such as the stringer 10B and the frame 10C.

Note that, technology of diagnosing degradation, a damaged position or a degree of damage in a structural object, such as an aircraft part, a building, a windmill, a bridge, nuclear facility or a pipeline, by placing a sensor in the structural object and analyzing change in an ultrasonic wave or a physical quantity, such as an acceleration, detected by the sensor placed in the structural object is called SHM (structural health monitoring) technology.

In order to perform an ultrasonic inspection for SHM or the like of various structural objects including the aircraft structural object 10 as shown in FIG. 2 and FIG. 3, it is desirable to arrange the appropriate numbers of ultrasonic transducers and ultrasonic sensors at appropriate positions. Specifically, it is important to arrange the appropriate numbers of ultrasonic transducers and ultrasonic sensors at appropriate positions so that a waveform change of an ultrasonic wave resulting from a defect can be certainly detected, in order to secure detection accuracy of a defect in an inspection area.

When the numbers of ultrasonic transducers and ultrasonic sensors can be decreased, the number of parts composing an ultrasonic inspection system can also be decreased. In particular, when an object of an ultrasonic inspection is an aircraft structural object, the reduction in the number of parts leads to reduction in weight which is important for an aircraft. Therefore, it is desirable to place the minimum necessary numbers of ultrasonic transducers and ultrasonic sensors in the optimum positions while keeping detection accuracy of a defect.

In many cases, an ultrasonic transducer and an ultrasonic sensor each has directivity, Therefore, it is also desirable to determine directions of each ultrasonic transducer and each ultrasonic sensor so that the detection accuracy of a defect can be secured using the minimum necessary numbers of ultrasonic transducers and ultrasonic sensors.

In addition, a waveform change of an ultrasonic wave resulting from a defect, such as damage, changes also depending on a frequency of the ultrasonic wave, Therefore, a detection capability and a detection range of a defect changes depending on a frequency of an ultrasonic wave oscillated from an ultrasonic transducer. Therefore, it is desirable to determine a frequency of an ultrasonic wave so that a detection capability and a detection range of a defect can be improved.

Accordingly, at least one of the number of ultrasonic sensors, positions of the ultrasonic sensors, directions of the ultrasonic sensors, the number of ultrasonic transducers, positions of the ultrasonic transducers, directions of the ultrasonic transducers and frequencies of ultrasonic waves oscillated from the ultrasonic transducers can be optimized by optimization calculation of which parameters include at least one of the number of the ultrasonic sensors, the positions of the ultrasonic sensors, the directions of the ultrasonic sensors, the number of the ultrasonic transducers, the positions of the ultrasonic transducers, the directions of the ultrasonic transducers and the frequencies of the ultrasonic waves oscillated from the ultrasonic transducers. The optimization calculation can be performed by the design system 1 of an ultrasonic inspection system.

An algorithm of the optimization calculation can be determined according to parameters to be optimized, a purpose of an ultrasonic inspection, a structure of an object which is a target of an ultrasonic inspection, circumstances where an ultrasonic inspection is performed, and the like.

As a concrete example, positions of at least one of ultrasonic sensors and ultrasonic transducers can be optimized by an optimization calculation by which the detection accuracy of a defect generated at an uncertain position in an inspection area is maximized while keeping the number of the ultrasonic sensors and the number of the ultrasonic transducers constant respectively. In this case, an optimization calculation, which calculates positions of at least one of ultrasonic sensors and ultrasonic transducers when a probability that a waveform change detectable by a signal processing system arises in an ultrasonic detection signal, due to a defect which occurred at an uncertain position in an object area, becomes the maximum can be performed. That is, at least one of positions of ultrasonic sensors and positions of ultrasonic transducers can be set to parameters of an optimization calculation. Then, values of the parameters can be calculated by the optimization calculation as those when a probability that a waveform change due to a defect generated at an uncertain position in an object area of an ultrasonic inspection arises in an ultrasonic detection signal detected by at least one ultrasonic sensor becomes the maximum.

In this case, design information, on an ultrasonic inspection system, including the optimum positions of a certain numbers of ultrasonic sensors and ultrasonic transducers can be created by the design system 1. When an ultrasonic inspection system is assembled according to the design information created as described above, the produced ultrasonic inspection system becomes one of which at least one of ultrasonic transducers and ultrasonic sensors have been disposed where a probability that a waveform change which can be detected by a signal processing system arises, due to a defect which occurred at an uncertain position in an object area, in an ultrasonic detection signal becomes the highest.

Alternatively, not only positions of ultrasonic transducers and ultrasonic sensors, but also the numbers of ultrasonic sensors and ultrasonic sensors, and frequencies of ultrasonic waves may be also included in parameters of an optimization calculation. In that case, the minimum numbers of the ultrasonic transducers and the ultrasonic sensors, and the frequencies of the ultrasonic waves for keeping detection accuracy of a defect, which was generated at an uncertain position in an inspection area, in a required accuracy, can be calculated by the optimization calculation.

That is, not only the numbers and positions of ultrasonic transducers and ultrasonic sensors but frequencies of ultrasonic waves which allow detecting a waveform change of an ultrasonic detection signal, caused by a defect, by a signal processing system even when the defect occurs at any position in an object area of an ultrasonic inspection can be calculated by the optimization calculation. In other words, the number of ultrasonic sensors, positions of the ultrasonic sensors, the number of ultrasonic transducers, positions of the ultrasonic transducers and frequencies of ultrasonic waves by which a waveform change due to a defect can be generated in an ultrasonic detection signal detected by at least one ultrasonic sensor even when the defect occurs at any position in an object area can be calculated by the optimization calculation.

In this case, when an ultrasonic inspection system is assembled according to design information, including the numbers and positions of ultrasonic transducers and ultrasonic sensors, created by the design system 1, the produced ultrasonic inspection system becomes one of which the numbers and positions of ultrasonic transducers and ultrasonic sensors, and frequencies of ultrasonic waves allow detecting a waveform change, due to a defect, of an ultrasonic detection signal by a signal processing system even when the defect occurs at any position in an object area.

Alternatively, when flexibility in arrangement of ultrasonic transducers and ultrasonic sensors is low and a desired number of the ultrasonic transducers or a desired number of ultrasonic sensors are disposed at a same interval along a one-dimensional straight line or curved line, an optimization calculation which optimizes not positions of the ultrasonic transducers and the ultrasonic sensors but only the number of the ultrasonic transducers and the number of the ultrasonic sensors may be carried out. In this case, detection accuracy of a defect can be set to a constraint of the performed optimization calculation. This is also applied to a case where ultrasonic transducers and/or ultrasonic sensors are disposed regularly on a two-dimensional or three-dimensional lattice points of which distances between the lattice points can be varied.

Moreover, when the numbers of ultrasonic transducers and ultrasonic sensors and a frequency of ultrasonic waves are set to parameters of an optimization calculation, a frequency of the ultrasonic waves appropriate to minimize the numbers of the ultrasonic transducers and the ultrasonic sensors can also be calculated. Alternatively, only a frequency of ultrasonic waves may be set to a parameter of an optimization calculation. In that case, a frequency of the ultrasonic waves for maximizing a detection capability and a detection range of a defect can be calculated.

When a position of a defect is uncertain, the position of the defect in an optimization calculation can be changed within a range where the defect may be generated. Thereby, a combination of parameters, including the number of ultrasonic sensors, positions of the ultrasonic sensors, directions of the ultrasonic sensors, the number of ultrasonic transducers, positions of the ultrasonic transducers, directions of the ultrasonic transducers and frequencies of ultrasonic waves, by which a waveform change can be generated in an ultrasonic wave regardless of a position of a defect can be calculated.

Moreover, when temperature of an object where an ultrasonic wave propagates or humidity in the periphery of the object where the ultrasonic wave propagates changes, a waveform of the ultrasonic wave may change to the non-negligible extent even when a position of a defect is constant. Thus, optimization calculation may also be performed by changing not only a position of a defect but also environmental conditions, such as temperature of an object where an ultrasonic wave propagates, and humidity in the periphery of the object where the ultrasonic wave propagates. Thereby, a combination of parameters by which a waveform change can be generated in an ultrasonic wave regardless of environmental conditions, such as temperature and humidity, can be calculated.

In addition, at least one of an occurrence probability of a defect, an occurrence frequency of a defect, a type of a defect, and a weight of a defect can also be included in conditions of optimization calculation. For example, a combination of parameters can also be calculated so that a type of a defect which should be avoided preferentially and a defect which occurred at a position with high occurrence probability can be detected as change of an ultrasonic wave waveform with higher precision.

Therefore, occurrence conditions of a defect and propagation conditions of an ultrasonic wave, such as a position of the defect, temperature of an object where the ultrasonic wave propagates, humidity in the periphery of the object here the ultrasonic wave propagates, an occurrence probability of the defect, an occurrence frequency of the defect, a weight of the defect and a type of the defect, can be changed in an optimization calculation which optimizes parameters, such as the number of ultrasonic sensors, positions of the ultrasonic sensors, directions of the ultrasonic sensors, the number of ultrasonic transducers, positions of the ultrasonic transducers, directions of the ultrasonic transducers and frequencies of ultrasonic waves.

A waveform change of an ultrasonic detection signal necessary for optimization calculation can be obtained by a simulation of an ultrasonic waveform. The simulation of an ultrasonic waveform can be performed by an FEM. Specifically, the simulation can be performed by an FEM analysis in which a model simulating an object of an ultrasonic inspection is segmented into elements and a waveform of an ultrasonic wave oscillated from an ultrasonic transducer to an object area of the ultrasonic inspection is obtained. The simulation can be performed easily since software which performs an ultrasonic propagation analysis by an FEM has been on the marketed.

Figure 4:
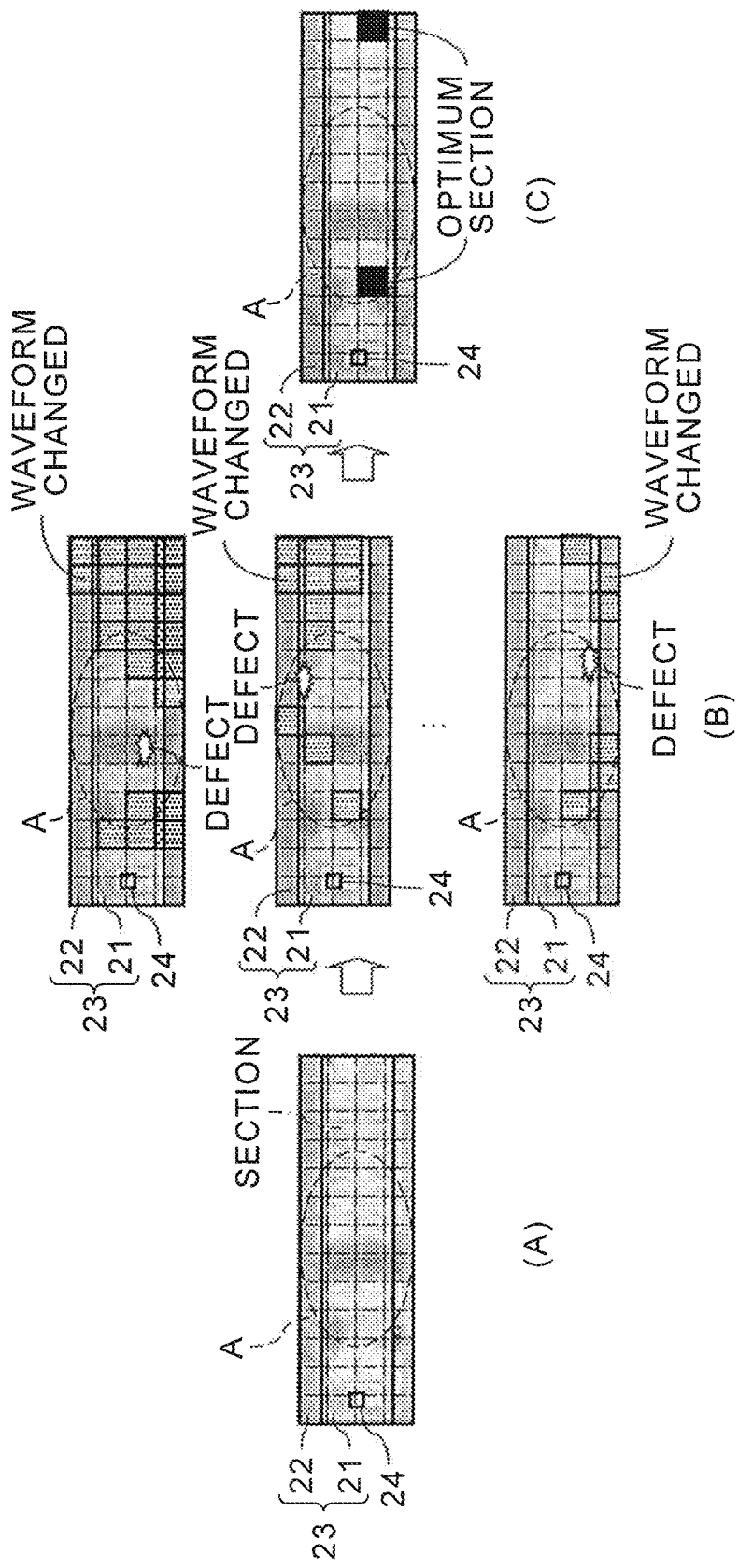
FIG. 4 shows an example of a case where a position of an ultrasonic sensor is optimized by ultrasonic wave propagation analysis simulation using an FEM model produced in the modeling part of the design system shown in FIG. 1.

FIG. 4 shows an example of a case where a position of an ultrasonic sensor is optimized by ultrasonic wave propagation analysis simulation using an FEM model produced in the modeling part 5 of the design system 1 shown in FIG. 1.

A structure having a web 21 and flanges 22A can be simulated by producing a structure model 23 as exemplified by (A) in FIG. 4. The structure model 23 is segmented into many elements for the FEM analysis of a propagation behavior of an ultrasonic wave. The flanges 22 as well as the web 21 can also be segmented into elements for the FEM analysis. Thereby, a propagation behavior of an ultrasonic wave can be simulated more exactly while the flanges 22 can be included in an object area A of an ultrasonic inspection.

In the structure model 23, at least one ultrasonic transducer model 24 can be disposed. While the number and positions of the ultrasonic transducer models 24 may be changed as parameters, an example where the single ultrasonic transducer model 24 is fixed to a predetermined position will be described firstly.

When a position of the ultrasonic transducer model 24 is fixed, a propagation waveform of an ultrasonic wave can be simulated in an element unit for the FEM analysis by a propagation analysis of the ultrasonic wave. That is, a waveform of an ultrasonic wave oscillated from an actual ultrasonic transducer to an object area of an ultrasonic inspection can be simulated on the structure model 23.

Meanwhile, separately from the elements for the FEM analysis, sections for determining the optimum position of an ultrasonic sensor can be produced on the structure model 23. In an example shown in FIG. 4, the structure model 23 including the web 21 and the flanges 22 is divided into rectangular sections by a mesh.

Each section is produced as a candidate of a position for disposing an ultrasonic sensor. Therefore, identification information on each section is a value of a parameter showing a position of an ultrasonic sensor. In other words, a position of an ultrasonic sensor, which is one of parameters to be optimized, can be expressed as a position of a section. Then, the optimum section as an arrangement position of an ultrasonic sensor can be specified from the sections by optimization calculation.

Therefore, it is appropriate to make a size of each section, for determining the optimum position of an ultrasonic sensor, one corresponding to a size of the ultrasonic sensor. The diameter of a typical optical fiber sensor is about from 125 µm to 150 µm and the length is about from 1.5 mm to 3 mm. Therefore, a rectangular frame of several millimeters square can be produced as a section, for example.

An optical fiber sensor has reception directivity. Therefore, it is desirable to dispose an optical fiber sensor so that a length direction of the optical fiber sensor may be a propagation direction of an ultrasonic wave. Thus, a section of which width is about 10 mm in an advance direction of an ultrasonic wave may be produced so that the amount of data processing can be decreased by reducing a degree of freedom in a position of an ultrasonic sensor in the advance direction of the ultrasonic wave, for example.

That is, the smaller a size of each section is made, the more the optimization accuracy of a position for disposing an ultrasonic sensor improves while the more data processing amount increases. Therefore, it is appropriate to produce each section having a size which can secure the required optimization accuracy of a position for disposing an ultrasonic sensor.

It is appropriate to produce each section on a location, which can be a candidate of a position for disposing an ultrasonic sensor, from a viewpoint of avoiding unnecessary data processing. For example, when only a transmitted wave of an ultrasonic wave, which was transmitted through the object area A, is detected by an ultrasonic sensor, no section may be produced in an area behind the ultrasonic transducer model 24 where the transmitted wave, which was transmitted through the object area A, cannot arrive, in order to reduce data processing amount.

On the contrary, when sections are produced thoroughly so that the whole structure model 23 can be covered as exemplified in FIG. 4, the optimum position can be determined on the presupposition that a reflected wave of an ultrasonic wave, reflected by a defect is also detected by an ultrasonic sensor. Moreover, the optimum position can also be determined on the presupposition that a reflected wave of the ultrasonic wave, reflected on the flange 22 is also detected by an ultrasonic sensor.

A section to be a candidate of a position for disposing an ultrasonic sensor can be produced not only on the web 21 between the flanges 22 but also in an area which includes the flanges 22 as exemplified in FIG. 4. In particular, when an ultrasonic sensor is an optical fiber sensor, the optical fiber sensor can be embedded between the flange 22 and a panel, or attached on a side surface or an upper surface of the flange 22. Therefore, producing sections in an area including the flanges 22 makes it possible to determine the optimum position, of which candidates include a position between the flange 22 and a panel, a position on a side surface of the flange 22 and a position on an upper surface of the flange 22, for disposing an ultrasonic sensor.

When a plurality of sections is set on the structure model 23, a representative waveform of propagation waveforms of ultrasonic wave can be obtained for each section. A representative waveform of ultrasonic waveforms can be determined as a waveform at the center position in each section, an average of waveforms at respective positions in each section, or the like. An ultrasonic waveform representing each section can be used as an ultrasonic reference waveform in a case where no defect has occurred in the object area A of ultrasonic inspection.

When a position of the ultrasonic transducer model 24 is fixed as shown by (A) in FIG. 4, the optimum position of an ultrasonic sensor is a position at which an ultrasonic waveform sufficiently changes in a case where a defect occurs at an uncertain position in the object area A of ultrasonic inspection.

For that reason, a simulated defect can be generated in the object area A of an ultrasonic inspection on the structure model 23 as shown by (B) in FIG. 4. Furthermore, a position of the simulated defect can be changed sequentially in the object area A on the structure model 23.

Examples of a simulated defect introduced into the structure model 23 include not only damage, a dent, a break of fibers composing a composite material, and a delamination between fiber reinforced resin layers composing a composite material, caused by a collision of a bird or a stone, or the like, but a burnt deposit of a composite material due to a lightning strike, and a dropout or a looseness of a fastener, similar to an example of a defect which may be actually detected using an ultrasonic sensor.

When an actual structural object was damaged, the rigidity of a damaged part decreases by an amount according to a material, such as a metal or a composite material consisting of GFRP (Glass Fiber Reinforced Plastics), CFRP (Carbon Fiber Reinforced Plastics) or the like.

Each material of the structure model 23 can be expressed by parameters, such as Young's modulus, for specifying mechanical characteristics. Therefore, damage in the structure model 23 can be simulated by changing parameters, such as Young's modulus, of a specific element which configures the structure model 23. This is also the same about a burnt deposit of a composite material. A dent can be simulated by deforming an element which configures the structure model 23.

A break of fibers in a composite material, a delamination of a composite material, and a crack can be simulated by changing a transmission condition of a stress between elements which configure the structure model 23. Specifically, these defects can be simulated by changing at least one parameter which defines the structure model 23 so that a tensile stress and a shear stress may not be transmitted at all or may be transmitted at a constant rate between adjacent elements. Moreover, a dropout and a looseness of a fastener can also be simulated by modeling the fastener and changing a transmission condition of stress between the fastener and another part.

Thus, various types of simulated defects can be generated in the object area A of an ultrasonic inspection on the structure model 23 by at least one of change of Young's modulus of a specific element, change of a transmission condition of stress between specific elements and a deformation of shape of a specific element, out of elements which configure the structure model 23.

These various simulated defects can be each introduced into the structure model 23 with an experientially possible size at an experientially possible position. Therefore, a position at which a simulated defect is generated may be changed according to a type of the defect. For example, a bird may collide on a leading edge of a main wing of an aircraft while a bird does not collide inside of a fuselage. Meanwhile, a stone may collide on a lower surface of a fuselage while a possibility that a stone collides on an upper surface of the fuselage is negligible. Therefore, introduction of a simulated defect into the structure model 23 according to an occurrence probability for each type of the defect leads to the improvement in accuracy of optimization calculation and reduction in amount of data processing by avoiding unnecessary calculation.

As mentioned above, not only a position of simulated defect but a condition on defect and/or a condition on environmental, such as a type of a simulated defect, temperature when an ultrasonic waveform is simulated, humidity when an ultrasonic waveform is simulated, and an occurrence probability of a simulated defect, may be changed.

When simulations are performed by generating simulated defects in the object area A of an ultrasonic inspection under various conditions, a simulation result is obtained for each generation condition of the simulated defect. That is, a simulated waveform of ultrasonic wave for each generation condition of a simulated defect can be obtained by simulations. In an example shown by (B) in FIG. 4, simulations are performed by changing a position of a simulated defect. Therefore, a simulated waveform of ultrasonic wave is obtained for each position of the simulated defect.

When a simulated waveform of ultrasonic wave is obtained for the structure model 23 having a simulated defect, a change amount of the simulated waveform due to the simulated defect can be specified. The change amount of the simulated waveform due to the simulated defect can be specified for each section.

Figure 5:
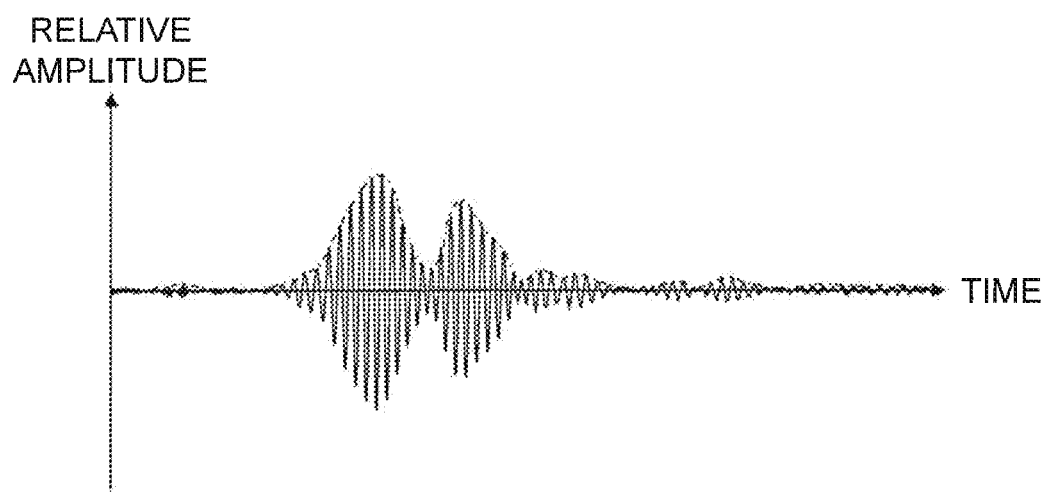
FIG. 5 is a graph showing an example of an ultrasonic detection signal which was transmitted in an undamaged inspection area.
Figure 6:
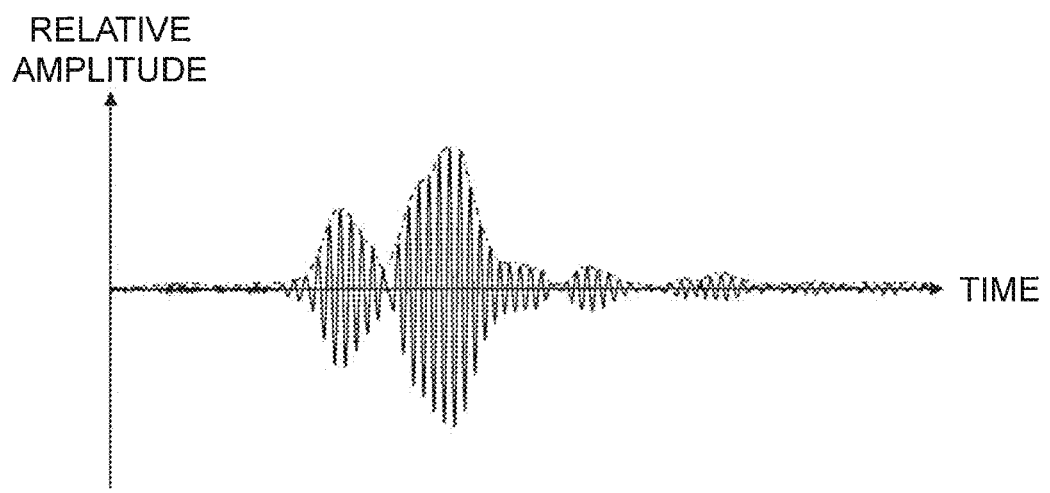
FIG. 6 is a graph showing an example of an ultrasonic detection signal which was transmitted in the damaged same inspection area.

FIG. 5 is a graph showing an example of an ultrasonic detection signal which was transmitted in an undamaged inspection area, and FIG. 6 is a graph showing an example of an ultrasonic detection signal which was transmitted in the damaged same inspection area.

In FIG. 5 and FIG. 6, each vertical axis shows relative amplitude of an ultrasonic detection signal, and each horizontal axis shows time. When a damaged portion exists in a propagation path of an ultrasonic wave, a waveform of the ultrasonic wave, which has transmitted through the damaged portion, changes as shown in FIG. 5 and FIG. 6. Therefore, the existence of a defect, such as damage, can be detected by monitoring a waveform change of ultrasonic wave.

Also in an ultrasonic propagation analysis for the structure model 23 as exemplified in FIG. 4, a simulated waveform of ultrasonic wave can also be changed according to the existence of a simulated defect. Specifically, a simulated waveform of an ultrasonic wave influenced by a simulated defect can be changed. Sections, in which the ultrasonic wave influenced by the simulated defect propagates, change according to a position of the simulated defect. Therefore, sections in which a simulated waveform of ultrasonic wave changes also change according to a position of the simulated defect.

That is, when a position of the simulated defect is changed, sections in which the ultrasonic wave influenced by the simulated defect propagate also change together with the propagation path of the ultrasonic wave influenced by the simulated defect. As mentioned above, the optimum position of an ultrasonic sensor is a position where an ultrasonic waveform sufficiently changes when a defect has occurred at an uncertain position in the object area A of an ultrasonic inspection. Therefore, the optimum position of an ultrasonic sensor can be considered to be in a section in which a simulated waveform of ultrasonic wave changes regardless of a position of a simulated defect.

Accordingly, sections in which a simulated waveform of ultrasonic wave changed due to the influence of a simulated defect can be recorded for each of simulations performed by changing a position of the simulated defect as shown by (B) in FIG. 4. The record on the sections in which the simulated waveform of ultrasonic wave changed can be performed not only by simple markings, i.e., with information showing whether the simulated waveform of ultrasonic wave changed or not, but also by scoring according to the change amount of the simulated waveform.

Then, as shown by (C) in FIG. 4, the records on the sections in which the simulated waveform changed under the influence of the simulated defect can be added to each other between the simulations performed by changing a position of the simulated defect. Thus, at least one section in which a possibility that the simulated waveform of ultrasonic wave changes regardless of a position of the simulated defect is high can be specified. Moreover, when each change amount of the simulated waveform is scored, a section with the highest possibility that the simulated waveform changes regardless of a position of the simulated defect can be specified.

Even when the simulated defect has been generated at a certain position, any simulated waveform does not change under the influence of the simulated defect in any section in some cases. Moreover, even when the simulated defect has been generated at any position, any simulated waveform does not change under the influence of the simulated defect in any section in some cases. Therefore, when the optimum section is selected according to the algorithm shown in FIG. 4, the selected section has the highest probability that a waveform of ultrasonic wave changes in a case where a defect occurred at an uncertain position in the object area A of an ultrasonic inspection.

When the simulated waveforms certainly change in different sections respectively, due to the simulated defects generated with positional change, a plurality of the sections may be selected as the optimum sections. In this case, some positions for ultrasonic sensors for allowing detecting at least one waveform change of an ultrasonic wave even when a defect has occurred at any position can be specified.

In some cases, many sections may be selected as the optimum solutions. For that reason, when it is desirable to suppress increase in the number of ultrasonic sensors, an upper limit may be set to the number of sections which can be selected as positions for disposing ultrasonic sensors. In this case, when sections of which number exceeded the upper limit were selected, the number of the ultrasonic transducer models 24 may be increased. As a concrete example, when the upper limit of the number of positions for disposing ultrasonic sensors, which can be selected per one ultrasonic transducer model 24, is set to one, the optimum positions of pairs of an ultrasonic transducer and an ultrasonic sensor can be obtained.

Even when there is no section in which a simulated waveform changes under the influence of a simulated defect generated at a certain position, the number of the ultrasonic sensor models 24 can be increased and a new ultrasonic sensor model 24 can be disposed at another position in the structure model 23. Thereby, a section in which the simulated waveform changes under the influence of the simulated defect can be certainly generated. Then, a single section or some sections from which at least one waveform change of an ultrasonic wave can be detected even when a defect occurred at any position can be specified.

On the contrary, when a simulated waveform changes in all the sections under the influence of a simulated defect generated with changing its position, one section in which a change amount of the simulated waveform is the largest can be specified by scoring the change amounts of the simulated waveform.

Whether a simulated waveform of ultrasonic wave changed under the influence of a simulated defect or not can be determined for each section by comparing the simulated waveform of ultrasonic wave, obtained by a simulation after introducing the simulated defect, with a simulated reference waveform consisting of a simulated waveform of ultrasonic wave obtained by a simulation before introducing the simulated defect The comparison of a simulated waveform after introducing simulated defect with a simulated reference waveform before introducing the simulated defect can be performed by not only direct comparison of the simulated waveforms with each other, but desired processing like comparison after analysis processing, such as Fourier analysis processing, wavelet analysis processing, or the like. In a case of direct comparison of simulated waveforms with each other, times at which amplitudes of ultrasonic detection signals become the maximums respectively can be compared with each other, for example. In this case, a time difference between peak times is a change amount of a simulated waveform. Then, when the time difference between the peak times became not less than a threshold value or more than a threshold value, it can be determined that a simulated waveform changed.

Both a simulated waveform and simulated reference waveform of ultrasonic wave are obtained by simulations, and therefore, have no noise unlike an ultrasonic detection signal detected by an actual ultrasonic sensor. Therefore, signal processing for noise reduction, such as filter processing and averaging processing, which targets an ultrasonic detection signal output from an actual ultrasonic sensor, is unnecessary. On the contrary, processing, such as envelope detection processing, for extracting characteristic of a waveform may be performed for a simulated waveform and simulated reference waveform of an ultrasonic wave, similarly to Fourier analysis processing or wavelet analysis processing.

When conditions of a simulation before introducing a simulated defect are different from those of a simulation after introducing the simulated defect other than the existence of the simulated defect, a simulated waveform of ultrasonic wave may change in all the sections.

As a concrete example, when temperature of the structure model 23 or humidity around the structure model 23 is changed, a propagation condition of a simulated waveform of ultrasonic wave in a simulation also changes. Therefore, a simulated waveform of ultrasonic wave changes in each section. On the contrary, when there is a section in which a simulated waveform of ultrasonic wave did not change while the simulated waveform of ultrasonic wave changed in the surrounding sections under the influence of temperature change or humidity change, the simulated waveform in the section may not have changed under the influence of a simulated defect.

In such a case, only comparing a simulated waveform of ultrasonic wave after introducing a simulated defect with a simulated reference waveform of the ultrasonic wave before introducing the simulated defect cannot obtain a change of the simulated waveform due to the simulated defect.

Thus, change amounts of a simulated waveform of ultrasonic wave, from a simulated reference waveform can be compared with each other among sections. For example, a representative value, such as an average value or an intermediate value, of change amounts of a simulated waveform of ultrasonic wave in all the sections or surrounding sections can be obtained. Then, a change amount of the simulated waveform of ultrasonic wave in each section can be compared with the obtained representative value. In this case, changes of the simulated waveform of ultrasonic wave, caused by factors except for the existence of a simulated defect, can be calculated. Accordingly, a change of the simulated waveform due to the simulated defect can be extracted.

Therefore, a section in which a simulated waveform of ultrasonic wave changed under the influence of a simulated defect can be specified even in a case where the simulated waveform changed in all the sections caused by difference between conditions of simulations before introducing the simulated defect and after introducing the simulated defect, other than the existence of the simulated defect.

Then, similar comparison of change amounts of a simulated waveform among sections can be performed for each simulation performed with changing a simulated defect. Thereby, a section or sections in which the simulated waveform changed due to the simulated defect regardless of a position of the simulated defect can be specified. That is, a change amount of a simulated waveform in each section can be compared with that in another section. Then, the optimum position of an ultrasonic sensor can be determined to the inside of any one of the sections, based on a comparison result.

As described above, when change amounts of a simulated waveform of ultrasonic wave is compared with each other among sections, a section or sections in which the simulated waveform changed under the influence of a simulated defect can be specified using a simulated reference waveform obtained by a simulation under different conditions except for the existence of the simulated defect. Therefore, many simulations for obtaining simulated reference waveforms corresponding to many simulation conditions including temperature and humidity can be made unnecessary. In other words, a simulation after introducing a simulated defect can be performed under conditions, including temperature and humidity, different from those of a simulation before introducing the simulated defect in order to obtain a simulated reference waveform of the simulated ultrasonic wave.

On the contrary, when simulation conditions before introducing a simulated defect are same as those after introducing the simulated defect other than the existence of the simulated defect, a simulated waveform does not change in any section unless the simulated ultrasonic wave is influenced by the simulated defect. Therefore, the comparison of change amounts of the simulated waveform of ultrasonic wave among sections can be omitted.

The processing of creating sections on the structure model 23 as exemplified by FIG. 4 and determining the optimum section as a position for disposing an ultrasonic sensor by optimization calculation including simulations of ultrasonic waves can also be performed for a position of an ultrasonic transducer. That is, an ultrasonic sensor model can be fixed on a certain position, and simulations can be performed with changing a section including a position for oscillating a simulated ultrasonic wave and changing a position of a simulated defect.

In this case, a section including a position for oscillating an simulated ultrasonic wave when a possibility that a simulated waveform changes, due to a simulated defect, at a position at which an ultrasonic sensor model has been disposed, regardless of a position of the simulated defect, becomes the highest can be specified. Then, the inside of the specified section can be determined as the optimum position for disposing an ultrasonic transducer. Therefore, positions of both an ultrasonic sensor and an ultrasonic transducer can be optimized.

When an ultrasonic inspection system is assembled by disposing at least one of an ultrasonic sensor and an ultrasonic transducer in section or sections determined in such a way, the ultrasonic inspection system is produced so that at least one of the ultrasonic transducer and the ultrasonic sensor is disposed in the section or sections where a possibility that at least a waveform change detectable with a signal processing system arises in an ultrasonic detection signal, due to a defect which occurred at an uncertain position in an object area of an ultrasonic inspection, becomes the highest, out of sections virtually made on the surface of an object which is a target of the ultrasonic inspection.

In particular, when an optimization algorithm which increases the number of ultrasonic transducer models so that a section in which a simulated waveform changes under the influence of a simulated defect is certainly generated even when a position of the simulated defect is changed is adopted, an ultrasonic inspection system can be produced so that at least one of an ultrasonic transducer and an ultrasonic sensor is disposed in a section or sections where a waveform change detectable with a signal processing system arises in an ultrasonic detection signal even when a defect occurred at any position within an object area of an ultrasonic inspection, out of sections virtually made on the surface of an object which is a target of the ultrasonic inspection.

The design information creation part 6 of the design system 1 shown in FIG. 1 can have desired functions according to an algorithm of the optimization calculation as mentioned above. In an example shown in FIG. 1, the design information creation part 6 has a section creation part 6A, a defect condition introduction/change part 6B, an environmental condition change part 6C, a parameter optimization setup/change part 6D, a simulation part 6E, a waveform change acquisition part 6F, a waveform change comparing part 6G and a parameter optimum value determination part 6H. The section creation part 6A creates sections on an FEM model, for simulations, which simulates an object of an ultrasonic inspection. The defect condition introduction/change part 6B introduces a simulated defect into the FEM model with changing conditions, such as a generation position, a type and an occurrence probability, of the simulated defect. The environmental condition change part 6C changes environmental conditions, such as temperature and humidity, in the simulations. The parameter optimization setup/change part 6D sets and changes initial values of parameters to be optimized, such as the number of ultrasonic sensors, positions of the ultrasonic sensors, directions of the ultrasonic sensors, the number of ultrasonic transducers, positions of the ultrasonic transducers and directions of the ultrasonic transducers. The simulation part 6E simulates a waveform of an ultrasonic wave for each of given conditions of the simulated defect and environmental conditions by the FEM analysis. The waveform change acquisition part 6F obtains a change amount of the simulated waveform before and after introducing the simulated defect for each section. The waveform change comparing part 6G specifies a change amount of the simulated waveform caused by the simulated defect, for each section, by comparing change amounts of the simulated waveform before and after introducing the simulated defect with each other among the sections. The parameter optimum value determination part 6H determines values of the parameters to be optimized by selecting the optimum section or the optimum sections as a position or positions of at least one ultrasonic sensor and at least one ultrasonic transducer, based on the change amount of the simulated waveform caused by the simulated defect for each section.

(Method of Producing Ultrasonic Inspection System and Aircraft Structural Object)

Next, a method of producing an ultrasonic inspection system, including designing an ultrasonic inspection system by the design system 1, and a method of producing an aircraft structural object mounting the ultrasonic inspection system will be described.

Figure 7:
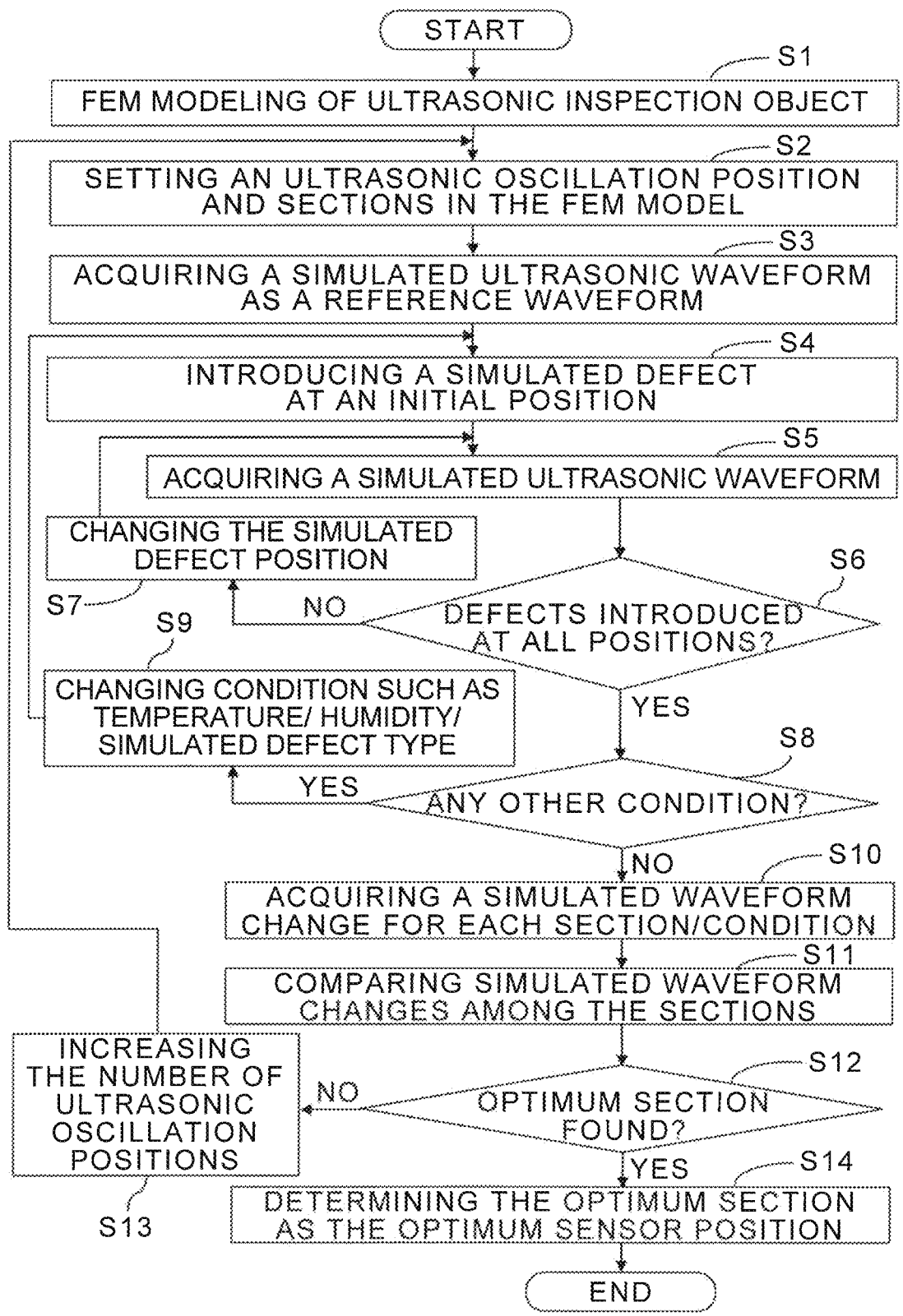
FIG. 7 is a flow chart showing an example flow of optimization calculation executed by the design system of an ultrasonic inspection system shown in FIG. 1.

FIG. 7 is a flow chart showing an example flow of optimization calculation executed by the design system 1 of an ultrasonic inspection system shown in FIG. 1.

A flow of processing shown in FIG. 7 shows an example where the optimum number and positions of ultrasonic sensors and the optimum number and positions of ultrasonic transducers are obtained as design information by optimizing the number and positions of the ultrasonic sensors, and the number of ultrasonic transducers with simulating a simulated waveform of ultrasonic wave with changing not only a position of a simulated defect but also other conditions, such as temperature and humidity.

Firstly, in step S1, the modeling part 5 of the design system 1 produces a model simulating an object of an ultrasonic inspection. For example, an FEM model simulating the aircraft structural object 10 in which the stringers 10B and the frames 10C have been attached on the panel 10A as shown in FIG. 2, or the structure model 23, having the web 21 and the flanges 22, for FEM analysis, as shown by (A) in FIG. 4, can be produced.

The produced FEM model is given from the modeling part 5 to the design information creation part 6. Thereby, an optimization calculation whose parameters include the number of the ultrasonic sensors, the positions of the ultrasonic sensors, and the number of the ultrasonic transducers can be started in the design information creation part 6 in order to create the design information on an ultrasonic inspection system.

Next, in step S2, the section creation part 6A creates sections, which are candidates of positions for disposing ultrasonic sensors, on the FEM model. The sections can be created as rectangular frames by segmenting the FEM model with a mesh as exemplified by (A) in FIG. 4. The creation of the sections corresponds to setting values which a position for disposing an ultrasonic sensor, which is one of the parameters to be optimized, can take.

Meanwhile, the parameter optimization setup/change part 6D determines at least one position for generating a simulated ultrasonic wave on the FEM model. The positions for generating the simulated ultrasonic waves can be determined to positions arranged at equal intervals on a linear range on which the positions for generating the simulated ultrasonic waves can lie, for example. In this case, since the initial value of the positions for generating the simulated ultrasonic waves is one, the position for generating the simulated ultrasonic wave lies on the center position of the linear range on which the positions for generating the simulated ultrasonic waves can lie, i.e., the position which divides the linear range into two line segments. Alternatively, a user may manually determine the position for generating the simulated ultrasonic wave by inputting information, for designating the position for generating the simulated ultrasonic wave, into the parameter optimization setup/change part 6D by operating the input device 2.

Such a determination of the positions for generating the simulated ultrasonic waves corresponds to setting the number of the ultrasonic transducers and the positions for disposing the ultrasonic transducers of which number has been set, which are each one of the parameters to be optimized.

Next, in step S3, the simulation part 6E performs a simulation of an ultrasonic inspection using the FEM model. Specifically, an analysis simulation of ultrasonic wave propagation behavior is performed for the FEM model simulating an object of the ultrasonic inspection. Thereby, a waveform of an ultrasonic wave oscillated from an ultrasonic transducer to an object area of the ultrasonic inspection defined in the FEM model can be simulated on the FEM model. The simulated waveform of the ultrasonic wave is given to the waveform change acquisition part 6F as simulated reference waveforms in the respective sections.

Next, in step S4, the defect condition introduction/change part 6B generates a simulated defect at an initial position in the object area of the ultrasonic inspection on the FEM model.

Next, in step S5, the simulation part 6E performs a simulation of the ultrasonic inspection using the FEM model again. Thereby, a simulated waveform of ultrasonic wave after generating the simulated defect can be obtained for each section. The obtained simulated waveform of ultrasonic wave for each section is given to the waveform change acquisition part 6F.

Next, in step S6, the defect condition introduction/change part 6B determines whether the simulated defect has been generated at every position where the simulated defect should be generated. Specifically, the defect condition introduction/change part 6B determines whether any, position where the simulated defect has not been generated remains in the object area to be inspected on the FEM model.

When it is determined that the simulated defect has not been generated at every position, i.e., when NO is judged in the judgment of step S6, the defect condition introduction/change part 6B changes a position of the simulated defect within the object area to be inspected on the FEM model, in step S7. Then, again in step S5, a simulated waveform of ultrasonic wave after generating the simulated defect at the changed position is obtained for each section.

These change of the position of the simulated defect in step S7 and acquisition of a simulated waveform of ultrasonic wave in step S5 are repeated until it is determined that the simulated defect has been generated at every position, i.e., until YES is judged in the judgment of step S6. Thereby, the simulated waveforms of ultrasonic waves corresponding to all the positions of the simulated defects can be obtained for each section.

When YES is judged in the judgment of step S6, it is determined whether there is another simulation condition which should be changed, in step S8. Examples of the simulation condition which should be changed include environmental conditions, such as temperature and humidity, at the time of simulating a waveform of an ultrasonic wave on the FEM model, besides a type of the simulated defect.

Therefore, the defect condition introduction/change part 6B determines whether there is another type of the simulated defect which should be generated, for example. Meanwhile, the environmental condition change part 6C determines whether there is an environmental condition, such as temperature or humidity, which should be changed.

In the judgment of step S8, when it is determined that there is a simulation condition which should be changed, i.e., YES is judged, the simulation condition is changed in step S9. Specifically, when the simulation condition which should be changed is the type of the simulated defect, the defect condition introduction/change part 6B changes the type of the simulated defect. Meanwhile, when the simulation condition which should be changed is an environmental condition, such as temperature or humidity, the environmental condition change part 6C changes the environmental condition, such as temperature or humidity.

Then, simulated waveforms of ultrasonic waves corresponding to all the positions of the simulated defects are obtained for each section again by the processing from step S4 to step S7. These change of a simulation condition in step S9 and acquisition of the simulated waveforms of ultrasonic waves corresponding to all the positions of the simulated defects for each section by the processing from step S4 to step S7 are repeated until it is determined that there is no simulation condition which should be changed, i.e., NO is judged in the judgment of step S8. Thereby, simulated waveforms of ultrasonic waves corresponding to all the simulation conditions and all the positions of the simulated defects can be obtained for each section.

When NO is judged in the judgment of step S8, the waveform change acquisition part 6F obtains a change amount of the simulated waveform of ultrasonic wave before and after generating the simulated defect for each section and each simulation condition, in step S10. When the simulation conditions except for the existence of the simulated defect were not changed from those for obtaining the simulated reference waveform in step S3, the change amount of each simulated waveform of ultrasonic wave is that generated due to the simulated defect.

On the other hand, when at least one simulation condition other than the existence of the simulated defect was changed from that for obtaining the simulated reference waveform in step S3, the change amount of each simulated waveform of ultrasonic wave is not necessarily that generated due to only the simulated defect. This is because each simulated waveform of ultrasonic wave is also changed from the simulated reference waveform due to the change of at least one simulation condition.

Thus, in step S11, the waveform change comparing part 6G compares the change amounts in the sections of the simulated waveform with each other among the sections. Thereby, even when at least one simulation condition other than the existence of the simulated defect was changed from that for obtaining the simulated reference waveform, a change amount which changed due to the simulated defect can be extracted from the change amount of the simulated waveform of ultrasonic wave in each section. Then, it can be determined whether the simulated waveform of ultrasonic wave in each section changed due to the simulated defect, based on the extracted change amount of the simulated waveform of ultrasonic wave.

Whether the simulated waveform of ultrasonic wave in each section changed under the influence of the simulated defect can be determined by combining signal analysis methods, for example.

Figure 8:
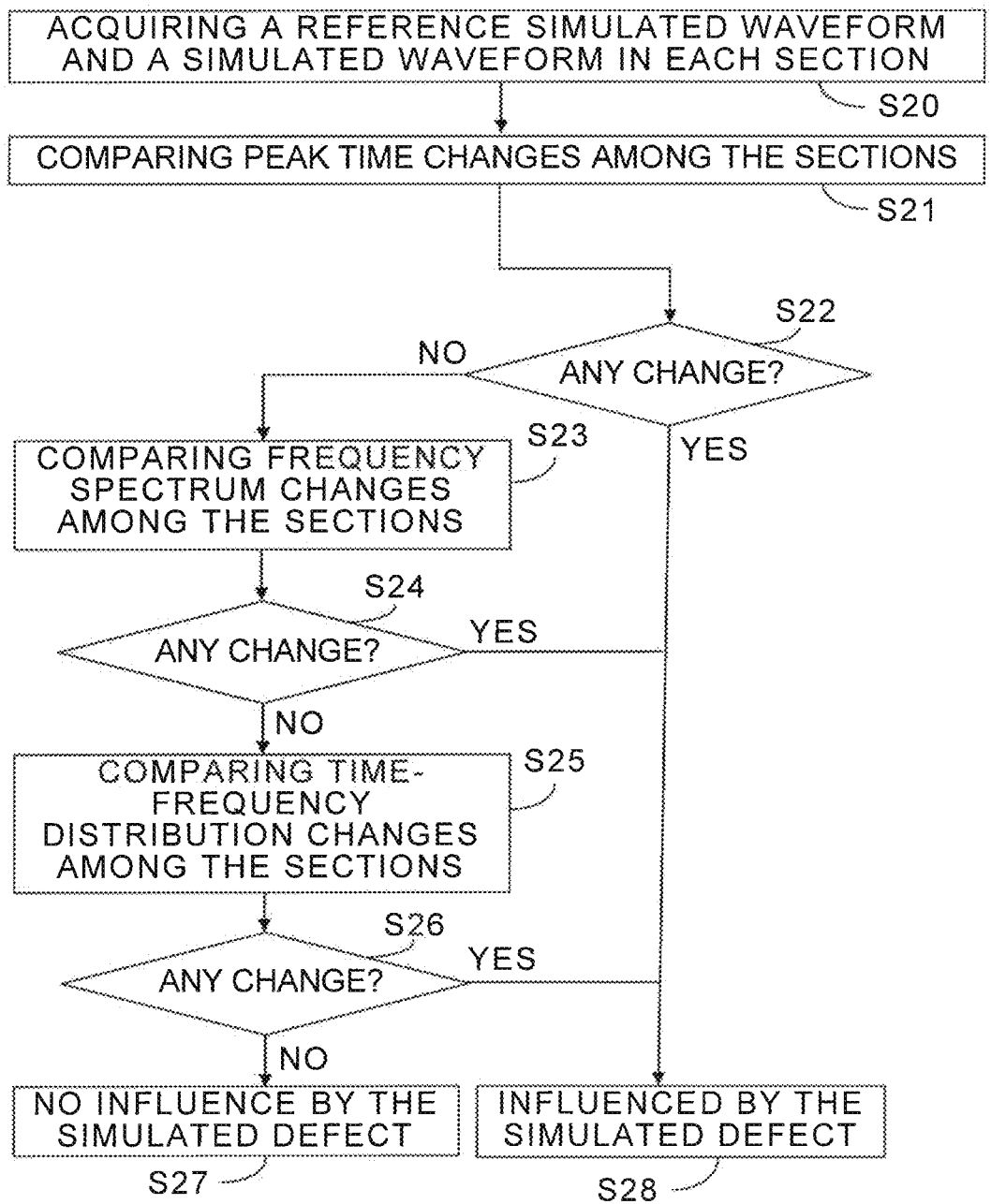
FIG. 8 is a flow chart showing an example of an algorithm to determine whether the simulated waveform of ultrasonic wave changed due to the simulated defect, in each section set in the FEM (Finite Element Method) model as exemplified in FIG. 4.

FIG. 8 is a flow chart showing an example of an algorithm to determine whether the simulated waveform of ultrasonic wave changed due to the simulated defect, in each section set in the FEM model as exemplified in FIG. 4.

Firstly, in step S20, the waveform change comparing part 6G obtains the simulated reference waveform before introducing the simulated defect and the simulated waveform after introducing the simulated defect, in each section.

Next, in step S21, the waveform change comparing part 6G calculates a change amount of a peak time of the simulated waveform, defined as a difference between the peak time of the simulated waveform and a peak time of the simulated reference waveform, in each section. Note that, the specification of the peak time of the simulated waveform in each section corresponds to obtaining an arrival time of the simulated ultrasonic wave to each section.

Then, the waveform change comparing part 6G compares the change amount of the peak time of the simulated waveform in a section to be determined, in which whether the simulated waveform changed under the influence of the simulated defect should be determined, with that in each of other sections. The sections to be compared may be all the sections or may be some of the sections near the section to be determined in order to reduce data processing amount. This comparison processing of the change amounts of the peak times is sequentially performed by targeting each section.

Next, in step S22, it is determined for each section to be determined whether the change amount of the peak time of the simulated waveform in the section to be determined has changed from that in each of other sections. For example, it can be determined whether the change amount of the peak time of the simulated waveform in the section to be determined has changed from that in each of other sections, by comparing a difference or a ratio of the change amounts of peak times between the sections, with a threshold value determined experientially.

Next, in step S23, the waveform change comparing part 6G performs Fourier analysis of the simulated waveform and the simulated reference waveform in each section where it was determined that the change amount of the peak time did not change from that in each of other sections, i.e., each section where NO was judged in the judgment of step S22. Then, a frequency spectrum of amplitude of the simulated waveform obtained by Fourier analysis of the simulated waveform is compared with a reference frequency spectrum of amplitude of the simulated reference waveform obtained by Fourier analysis of the simulated reference waveform. Thereby, a change amount of the frequency spectrum of the simulated waveform, from the reference frequency spectrum, is obtained. The change amount between the frequency spectra can be expressed by a desired index, such as a difference between frequencies which show peaks or a difference between peak values.

Then, the waveform change comparing part 6G compares the change amount of the frequency spectrum of the simulated waveform in each section where NO was judged in the judgment of step S22, with that in each of other sections. The sections to be compared may be all the sections, or may be some of the sections near the section to be determined in order to reduce data processing amount. When all the sections are compared, it is necessary to perform Fourier analysis of the simulated waveforms and the simulated reference waveforms in all the sections. This comparison processing of the change amounts of the frequency spectra is sequentially performed for each section where NO was judged in the judgment of step S22.

Next, with regard to each section where NO was judged in the judgment of step S22, it is determined whether the change amount of the frequency spectrum of the simulated waveform in the section has changed from that in each of other sections, in step S24. For example, it can be determined whether the change amount of the frequency spectrum of the simulated waveform in the section to be determined has changed from that in each of other sections, by comparing a difference or a ratio of index values expressing the change amounts of the frequency spectra between the sections, with a threshold value determined experientially.

Next, in step S25, the waveform change comparing part 6G performs wavelet analysis of the simulated waveform and the simulated reference waveform in each section where it was determined that the change amount of the frequency spectrum did not change from that in each of other sections, i.e., each section where NO was judged in the judgment of step S24. Then, a time-frequency distribution of amplitude of the simulated waveform obtained by the wavelet analysis of the simulated waveform is compared with a time-frequency distribution of amplitude of the simulated reference waveform obtained by wavelet analysis of the simulated reference waveform. Thereby, a change amount of the time-frequency distribution of amplitude of the simulated waveform, from the time-frequency distribution of amplitude of the simulated reference waveform is obtained. The change amount between the time-frequency distributions of amplitudes can be expressed by a desired index, such as a set of differences between frequencies and times which show peaks or a difference between peak values.

Then, the waveform change comparing part 6G compares the change amount of the time-frequency distribution of amplitude of the simulated waveform in each section where NO was judged in the judgment of step S24, with that in each of other sections. The section to be compared may be all the sections, or may be some of the sections near the section to be determined in order to reduce data processing amount. When all the sections are compared, it is necessary to perform wavelet analysis of the simulated waveform and the simulated reference waveform in all the sections. This comparison processing of the change amounts of the time-frequency distributions of amplitudes is sequentially performed for each section where NO was judged in the judgment of step S24.

Next, with regard to each section where NO was judged in the judgment of step S24, it is determined whether the change amount of the time-frequency distribution of amplitude of the simulated waveform has changed from that in each of other sections, in step S26. For example, it can be determined whether the change amount of the time-frequency distribution of amplitude of the simulated waveform in the section to be determined has changed from that in each of other sections, by comparing a difference or a ratio of the index values showing the change amounts of the time-frequency distributions of amplitudes between the sections, with a threshold value determined experientially.

Each section where it was determined that the change amount of time-frequency distribution of amplitude did not change from that in each of other sections, i.e., each section where NO was judged in the judgment of step S26 is determined as a section where the simulated waveform of ultrasonic wave did not change under the influence of the simulated defect, in step S27.

Meanwhile, each section where it was determined that the change amount of the peak time of the simulated waveform changed from that in each of other sections, i.e., each section where YES was judged in the judgment of step S22; each section where it was determined that the change amount of frequency spectrum of the simulated waveform changed from that in each of other sections i.e., each section where YES was judged in the judgment of step S24; and each section where it was determined that the change amount of time-frequency distribution of amplitude of the simulated waveform changed from that in each of other sections, i.e., each section where YES was judged in the judgment of step S26 are each determined as a section where the simulated waveform of ultrasonic wave changed under the influence of the simulated defect, in step S28.

Each section where it was determined that the simulated waveform of ultrasonic wave changed under the influence of the simulated defect can be also be ranked depending on which one of the change amount of the peak time of the simulated waveform, the change amount of the frequency spectrum, and the change amount of the time-frequency distribution of amplitude changed from that in each of other sections to a detectable degree. That is, the change amount of the simulated waveform, from the simulated reference waveform can be scored as mentioned above.

In such a way, the waveform change comparing part 6G can specify the change amount of the simulated waveform of ultrasonic wave, from the simulated reference waveform, due to the simulated defect, for each section. In particular, when the peak time analysis, Fourier analysis and wavelet analysis of the simulated waveform of ultrasonic wave are used together, it can be determined whether the simulated waveform in each section changed under the influence of the simulated defect, with classification in degrees.

When the change amount of the simulated waveform of ultrasonic wave has been specified for each section, the parameter optimum value determination part 6H determines whether there is a section optimum as a position for disposing an ultrasonic sensor, in step S12 of FIG. 7. As a concrete example, when there is a section in which the simulated waveform changed under the influence of the simulated defect regardless of the position of the simulated defect, the section can be determined as the optimum position for disposing an ultrasonic sensor. Meanwhile, when there are some sections in which the simulated waveform changed under the influence of the simulated defect regardless of the position of the simulated defect, one section in which the change amount of the simulated waveform due to the simulated defect became the largest can be determined as the optimum position for disposing an ultrasonic sensor, by scoring the change amounts.

Meanwhile, when there is no section in which the simulated waveform changed under the influence of the simulated defect regardless of the position of the simulated defect, it can be determined whether the simulated waveform certainly changes under the influence of the simulated defect in at least one of plural sections selected as the optimum positions for disposing ultrasonic sensors if only the plural sections are selected as the optimum positions. That is, it can be determined whether the simulated defects generated at all the positions can be each certainly detected as at least one change of the simulated waveform if only plural sections are selected. Then, when the simulated defects generated at all the positions can be covered by selecting plural sections of which number is not more than an upper limit, the plural sections can be determined as the optimum positions for disposing ultrasonic sensors.

On the contrary, when the simulated defects generated at all the positions cannot be covered unless many sections of which number is more than the upper limit are selected, it is required to dispose many ultrasonic sensors. As an extreme example, disposing ultrasonic sensors in all the sections is excessive, Meanwhile, when there is a position of the simulated defect where the simulated waveform does not change in any section, there is an undetectable defect even when an ultrasonic sensor is disposed in every section.

In such a case, it can be determined that there is no section optimum as a position for disposing an ultrasonic sensor, in the judgment of step S12. Then, the parameter optimization setup/change part 6D adds at least one position for generating the simulated ultrasonic wave, in step S13. After that, the processing from step S2 to step S11 is repeated again. For example, when the positions for generating the simulated ultrasonic waves are set at equal intervals within the linear range as mentioned above, positions for generating the simulated ultrasonic waves are set again in step S2. Moreover, the sections may be updated according to the positions for generating the simulated ultrasonic waves.

The processing from step S2 to step S11 is repeated until it is determined that there is at least one section optimum as a position for disposing an ultrasonic sensor in the judgment of step S12. When it has been determined that there is at least one section optimum as a position for disposing an ultrasonic sensor in the judgment of step S12, the parameter optimum value determination part 6H determines the inside of each section, which has been determined as the optimum, to the optimum position of an ultrasonic sensor, in step S14.

Thereby, design conditions, including the number and positions of the ultrasonic transducers, and the number and positions of the ultrasonic sensors, which allow detecting a defect, generated even at any position in an area to be inspected, by at least one ultrasonic sensor, using fewer ultrasonic transducers, can be obtained. Then, the parameter optimum value determination part 6H produces design information on an ultrasonic inspection system, including the number of the ultrasonic sensors, the positions of the ultrasonic sensors, the number of the ultrasonic transducers and the positions of the ultrasonic transducers. The produced design information on an ultrasonic inspection system can be notified to a user by displaying on the display 3. Moreover, the design information on an ultrasonic inspection system can be provided for a manufacturer or a manufacturing sector of an ultrasonic inspection system as a product consisting of information.

When the design information on an ultrasonic inspection system has been produced, an ultrasonic inspection system can be assembled based on the produced design information. The ultrasonic inspection system can also be assembled with the aircraft structural object 10 as exemplified in FIG. 2 and FIG. 3. When the ultrasonic inspection system is mounted on an aircraft structural object, the ultrasonic inspection system is a part of the aircraft structural object, and designing and producing the ultrasonic inspection system are parts of designing and producing the aircraft structural object respectively.

Effects

As described above, the method of producing an ultrasonic inspection system, the design system 1 of an ultrasonic inspection system and the design program of an ultrasonic inspection system produce design information including the numbers and positions of ultrasonic transducers and ultrasonic sensors, which are components of an ultrasonic inspection system, by an optimization calculation including an ultrasonic propagation analysis simulation.

Therefore, according to the method of producing an ultrasonic inspection system, the design system 1 of an ultrasonic inspection system and the design program of an ultrasonic inspection system, appropriate design information on ultrasonic transducers and ultrasonic sensors in order to detect the existence of a defect by an ultrasonic inspection with required accuracy. That is, it becomes possible to carry out an ultrasonic inspection with fewer components and with higher accuracy.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention

What is claimed is:

1. A method of producing an ultrasonic inspection system, comprising:
creating design information on the ultrasonic inspection system, the design information including a number of at least one ultrasonic sensor, a position of the at least one ultrasonic sensor, a direction of the at least one ultrasonic sensor, a number of at least one ultrasonic transducer, a position of the at least one ultrasonic transducer, a direction of the at least one ultrasonic transducer and a frequency of an ultrasonic wave oscillated from the at least one ultrasonic transducer, the design information being created by an optimization calculation of which at least one parameter includes at least one of the number of the at least one ultrasonic sensor, the position of the at least one ultrasonic sensor, the direction of the at least one ultrasonic sensor, the number of the at least one ultrasonic transducer, the position of the at least one ultrasonic transducer, the direction of the at least one ultrasonic transducer and the frequency of the ultrasonic wave, the optimization calculation including a simulation of an ultrasonic inspection for detecting a defect by the ultrasonic inspection system having the at least one ultrasonic sensor and the at least one ultrasonic transducer, the simulation being performed using a model simulating an object of the ultrasonic inspection; and
assembling the ultrasonic inspection system based on the design information, and wherein the optimization calculation includes:
creating sections on the model;
generating a simulated defect in an object area of the ultrasonic inspection, the object area being on the model;
simulating a waveform of the ultrasonic wave oscillated from the at least one ultrasonic transducer to the object area of the ultrasonic inspection, the ultrasonic wave waveform being simulated on the model;
specifying change amounts of the simulated waveform of the ultrasonic wave, the change amounts being caused by the simulated defect and corresponding to the sections respectively; and
determining an optimum position of the at least one ultrasonic sensor, based on a comparison result of the specified change amounts between the sections, the optimum position being inside one of the sections.

2. The method of producing the ultrasonic inspection system, according to claim 1,
wherein the optimization calculation further includes:
changing at least one simulated condition including at least one of a position of the simulated defect in the object area on the model, a temperature at which the waveform of the ultrasonic wave is simulated, a humidity at which the waveform of the ultrasonic wave is simulated and a type of the simulated defect.

3. A method of producing an aircraft structural object, comprising:
attaching the ultrasonic inspection system to the aircraft structural object, the ultrasonic inspection system being assembled by the method according to claim 2.

4. The method of producing the ultrasonic inspection system, according to claim 1,
wherein the simulation includes an ultrasonic propagation analysis under a finite element method, the ultrasonic propagation analysis sectioning the model into elements and calculating a waveform of the ultrasonic wave oscillated from the at least one ultrasonic transducer to the object area of the ultrasonic inspection and the simulated defect is generated by at least one of changing a Young's modulus of a specific element out of the elements, changing a transmission condition of a stress between specific elements out of the elements and deforming a shape of the specific element.

5. A method of producing an aircraft structural object, comprising:
attaching the ultrasonic inspection system to the aircraft structural object, the ultrasonic inspection system being assembled by the method according to claim 4.

6. A method of producing an aircraft structural object, comprising:
attaching the ultrasonic inspection system to the aircraft structural object, the ultrasonic inspection system being assembled by the method according to claim 1.

7. A method of producing an ultrasonic inspection system, comprising:
creating design information on the ultrasonic inspection system, the design information including a number of at least one ultrasonic sensor, an on object mounting position of the at least one ultrasonic sensor, a direction of the at least one ultrasonic sensor, a number of at least one ultrasonic transducer, an on object mounting position of the at least one ultrasonic transducer, a direction of the at least one ultrasonic transducer and a frequency of an ultrasonic wave oscillated from the at least one ultrasonic transducer, the design information being created by an optimization calculation of which at least one parameter includes at least one of the number of the at least one ultrasonic sensor, the object mounting position of the at least one ultrasonic sensor, the direction of the at least one ultrasonic sensor, the number of the at least one ultrasonic transducer, the object mounting position of the at least one ultrasonic transducer, the direction of the at least one ultrasonic transducer and the frequency of the ultrasonic wave, the optimization calculation including a simulation of an ultrasonic inspection for detecting a defect by the ultrasonic inspection system having the at least one ultrasonic sensor and the at least one ultrasonic transducer, the simulation being performed using a model simulating an object of the ultrasonic inspection; and
assembling the ultrasonic inspection system including mounting of at least one ultrasonic sensor and at least one ultrasonic transducer, based on the design information gained, on to a portion of the object of the ultrasonic inspection through which the ultrasonic wave of the mounted transducer passes.

8. A method of producing an aircraft structural object, comprising:
attaching the ultrasonic inspection system to the aircraft structural object, the ultrasonic inspection system being assembled by the method according to claim 7.

9. The method of claim 7 wherein the method further includes:
generating a simulated defect in an object area of the ultrasonic inspection, the object area being on the model;
simulating a waveform of the ultrasonic wave oscillated from the at least one ultrasonic transducer to the object area of the ultrasonic inspection, the ultrasonic wave waveform being simulated on the model; and
sequentially changing the position of the simulated defect within the object area, and repeating waveform simulation of the at least one ultrasonic transducer to the object area for each change in position to determine a section in the object area representing the highest probability in which the simulated waveform of the ultrasonic wave oscillated from the at least one ultrasonic transducer changes regardless of the position simulated defect positioning within the object area.

10. A method of producing an aircraft structural object, comprising:
attaching the ultrasonic inspection system to the aircraft structural object, the ultrasonic inspection system being assembled by the method according to claim 9.

* * * * *